United States Patent [19]

Roth

[11] Patent Number: 5,026,966
[45] Date of Patent: Jun. 25, 1991

[54] METHOD AND A DEVICE FOR CUTTING A TUB

[75] Inventor: Manfred Roth, Mornshausen, Fed. Rep. of Germany

[73] Assignee: Roth Werke GmbH, Dautphetal, Fed. Rep. of Germany

[21] Appl. No.: 456,111

[22] Filed: Dec. 21, 1989

[30] Foreign Application Priority Data

Dec. 24, 1988 [DE] Fed. Rep. of Germany ....... 3843897
Mar. 10, 1989 [DE] Fed. Rep. of Germany ....... 3907803

[51] Int. Cl.$^5$ .......................... B23K 26/00; B23K 9/00
[52] U.S. Cl. .......................... 219/121.72; 219/121.44; 219/121.39; 219/121.67
[58] Field of Search ....................... 219/121.78, 121.79, 219/121.67, 121.72, 121.82, 121.6, 121.85, 121.39, 121.44

[56] References Cited

U.S. PATENT DOCUMENTS

| 3,531,491 | 1/1976 | Stumpf | 219/121.67 |
| 4,670,640 | 6/1987 | Tylko et al. | 219/121.39 |
| 4,672,172 | 6/1987 | Pearl | 219/121.67 |
| 4,825,036 | 4/1985 | Bickel et al. | 219/121.78 |

FOREIGN PATENT DOCUMENTS

2656434  8/1979  Fed. Rep. of Germany .
3311125  9/1984  Fed. Rep. of Germany .

Primary Examiner—C. L. Albritton
Attorney, Agent, or Firm—Flynn, Thiel, Boutell & Tanis

[57] ABSTRACT

The invention relates to a method and a device for cutting a tub. To optimize the construction of the cutting line and to increase the cutting speed, the invention provides that a cutting device is supported on a carriage movable along a guide rail. The guide rail can be mounted on a tub to be cut up. The carriage has a drive and makes it possible to move the cutting device in an exact manner with the greatest possible advancing speed.

24 Claims, 6 Drawing Sheets

METHOD AND A DEVICE FOR CUTTING A TUB

FIELD OF THE INVENTION

The invention relates to a method for cutting a tube for the replacement of an existing tub, in particular a bath tub or a shower tub, by means of a vibration-free cutting device, and to such a device for cutting a tub.

BACKGROUND OF THE INVENTION

During renovation and/or redesigning of bathrooms it is many times desired to replace also the bath tub or rather the shower tub because the old tub is worn or because a new color or shape for the tub is desired.

It is known from the state of the art to remove the old tub in one piece thus at least partly destroying the wall and apron areas with their tiles.

In order to prevent that the tilework of the bathroom suffers excessively, it has been suggested to saw the old tub into transportable pieces in order to be able to remove these pieces without any greater damages to the remaining installations in a room. A method is known from German Patent No. 26 56 434, in which the old bath tub after removal of the mortar fixing the edge of the tub is cut up and is removed from the casing which remains standing. This method is very time-consuming and requires the greatest care since during the mechanical operation of loosening the edge of the tub from its mortar connection in the tiled areas the danger of destroying the tiles exists. The mortar fixing the tub edge must be removed according to the teaching of this patent prior to cutting up the tub because the cutting methods known according to the state of the art, like the metal compass saw or angle sander, produce such vibrations that without previous loosening of the tub the danger of tiles breaking out exists. Furthermore it has proven to be disadvantageous since cutting up the old tub into several pieces requires additional time. It is expensive and creates a considerable amount of dirt. Particularly the latter is very unfortunate when replacing a tub in a lived-in residence. Furthermore the cutting operations, which are done for example by compass saws or separating grinding disks, lead to a considerable noise development.

German OS No. 33 11 125 describes a method for installing tubs, in which method the old tub is cut up such that the edge remains, namely remains connected to the base. The new tub is according to this method placed onto the edge of the old tub and is connected to same after the center portion of the old tub has been removed. It is disadvantageous in this method that the new tub must have wider edges than the old tub so that the new tub has smaller inside dimensions than the old tub.

All up to now existing separating operations on old tubs are carried out by means of separating disks (for example by a one-hand angle sander) or saws (for example a compass saw). These are mechanical separating operations causing vibrations, noises and physical stress. Vibrations harbor the danger of damage to tile and mortar areas, noises bother the installer and others in the house, and the physical stress due to exertion during the guiding, dust development, enamel parts coming off, chips from the tub and the separating tool (for example separating disks and saw blades) additionally influence the installer.

Attention must be paid during such cutting operations that the tilework of the bathroom does not suffer and that in particular when the edge of the old bath tub is supposed to be kept as support for the new tub the wall or cement stabilization is not damaged.

It is common in known cutting methods to guide the cutting device manually along the respective cutting edge. This has furthermore the disadvantage that an optimum cutting speed cannot be achieved since the operator on the one hand can determine only according to feeling the advancing speed of the cutting device and on the other hand in particular in the case of cast-iron tubs, the thickness of which can be up to 16 mm, he cannot precisely guide the cutting device during the long cutting time so that without lateral deviations the shortest possible cutting line is produced. The lateral deviations result in an unintended widening of the cutting gap and thus in a considerable increase of the time needed. A further disadvantage of the manual guiding of a cutting device is that it is often not possible to produce precise cutting edges since the operator, in particular in the case of a longitudinal cut on a tub, must many times change his position and must reset the cutting device.

The basic purpose of the invention is to produce a method and a device of the above-mentioned type, which do not have a significant influence in view of the dust and noise development during the replacement of tubs, and which on the other hand with a simple design enable an optimization of the cutting operation, in particular a shortening of the cutting time and a precisioning of the separating line.

SUMMARY OF THE INVENTION

The invention is attained with respect to the method on the one hand by cutting the tubs by means of a vibration-free separating method, in particular by a plasma-cutting or laser-cutting method, and on the other hand by the cutting device being moved along a guide rail by means of a drive.

The method of the invention is distinguished by a number of advantages. By using a vibration-free cutting method a significant reduction of noise and dust development is obtained. Since according to a further suggestion the cutting device is moved along the guide rail, an exact, rectilinear cut is guaranteed. Deviations, in particular in lateral direction, which would result in an increase of the cutting time or in a widening of the separating line, are not possible. Since furthermore according to the invention the cutting device is moved by means of a drive, it is possible to select an advancing or cutting speed adapted in an optimum manner to the material and the dimensioning of the tub to be cut. While for example during cutting of a cast-iron tub a cutting speed of 81 mm/min. can be achieved manually, according to the invention the cutting speed can be 200 to 250 mm/min. This is achieved according to the invention by a rectilinear, very narrow cutting gap so that the available energy can be applied in an optimum manner in longitudinal direction of the cutting gap. Since according to the invention the cutting device is moved along the guide rail by means of a drive, the same cutting conditions are guaranteed over the entire cutting length, which can have considerable measurements in longitudinal direction of the tub. This also results in a clean construction of the cutting edge on the remaining edge area of the old tub.

The method of the invention utilizes advantageously a plasma cutting device.

The purpose is attained with respect to the device according to the invention by the cutting device being supported on a pivotal mounting, which is arranged on a carriage, which in turn is guided on at least one guide rail mountable on the tub. This design is distinguished by a high degree of simplicity and strength and can be used for many different shapes of tubs and tub constructions. It is here only necessary to suitably select the size and arrangement of the guide rail. Furthermore it is possible to mount the device of the invention on all sides of the tub so that a cut along the entire edge of the tub is possible.

The carriage is preferably designed self-propelled, since the rail will then not have to have additional drive mechanisms. Thus it is possible to use simply designed and strongly built rails.

To enable a cut also in the corner area of the edge of the tub and in order to be able to universally utilize the carriage, it is particularly advantageous when the mounting includes an arm pivotal about a vertical axis with the cutting device being mounted to the free end of said arm. The arm is preferably movable about an angle of traverse of 360°. Thus the cutting device can be placed in any desired direction relative to the rail. By pivoting the arm it is possible to exactly adjust the position of the cutting device.

It has proven to be particularly advantageous to construct the arm in many parts and to insert joints into said arm so that the cutting head can be adjusted always parallel to the inclined surfaces of the bath tub. The arm is advantageously designed extendably, with the sections of the arm arranged between the joints being able to be designed advantageously telescopically. Furthermore it has been advantageous to fasten the cutting head freely rotatably on the arm so that same automatically assumes its position with respect to the surface of the bath tub due to the inclination through the force of gravity. The distance of the cutting head, which distance is needed for cutting the bath tub can be obtained by suitable spacing elements arranged on the cutting head.

A further, particularly advantageous development of the invention provides that the guide rail can be fastened to the tub by means of suction means. These can be suction feet enabling a mounting on the old tub or on the tiles so that damage is not possible. In order to adapt the guide rail to the respective dimension of the tub, the suction means can be shifted preferably relative to the guide rail.

It can furthermore be advantageous when the guide rail length telescopically longitudinally variable, since it can then be fastened both longitudinally and also transversely on the tub.

The cutting device is, as has already been mentioned, constructed in a particularly advantageous manner in the form of a plasma cutting device. It is thereby furthermore advantageous when a heat protective shield is supported on a burner head, which shield, in the mounted state, is operatively connected to a safety switch to operate the cutting device. The safety switch is arranged such that the cutting device can operate only when the heat protective shield is mounted in a correct manner. This design prevents the cutting device during the cutting operation, in particular due to heat development and flying sparks, from damaging the tilework of the bathroom.

It can furthermore be advantageous according to the invention to cover the burner head and/or the heat protective shield by means of a screen. Said screen on the one hand can shield the radiation developed during the cutting operation, and on the other hand injuries to the operators due to contact with the heat protective shield are avoided. Furthermore additionally occurring sparks can be caught. In addition it is possible to arrange an exhaust device in the area of the heat protective shield in order to catch, in particular in poorly vented bathrooms, the gases and dust particles produced during the cutting operation.

It is particularly advantageous according to the invention to adjust the flow pressure in a range from 2 to 4 bar. This value of the hydraulic pressure results in significant extensions of the life of the cutting nozzle, the electrode and the heat protective shield.

A particularly favorable further development of the invention provides that the cutting device has a power-supply compensation to connect to a 220 V-current supply. The known cutting devices always need a 380 V-current connection so that the outlets usually existing in a household cannot be used. The power-supply compensation is done by lowering the reactive current using an impedance coil and a capacitor.

BRIEF DESCRIPTION OF THE DRAWINGS

The invention will be described hereinafter in connection with one exemplary embodiment and the drawings, in which.

DETAILED DESCRIPTION

Figure 1:
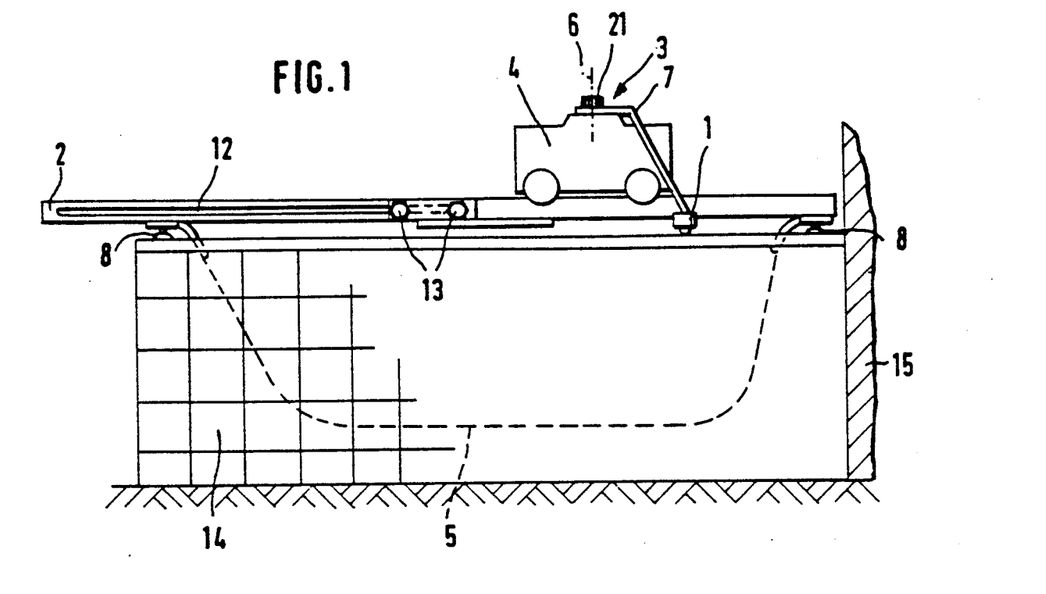
FIG. 1 is a schematic side view of one exemplary embodiment of the device of the invention.
Figure 2:
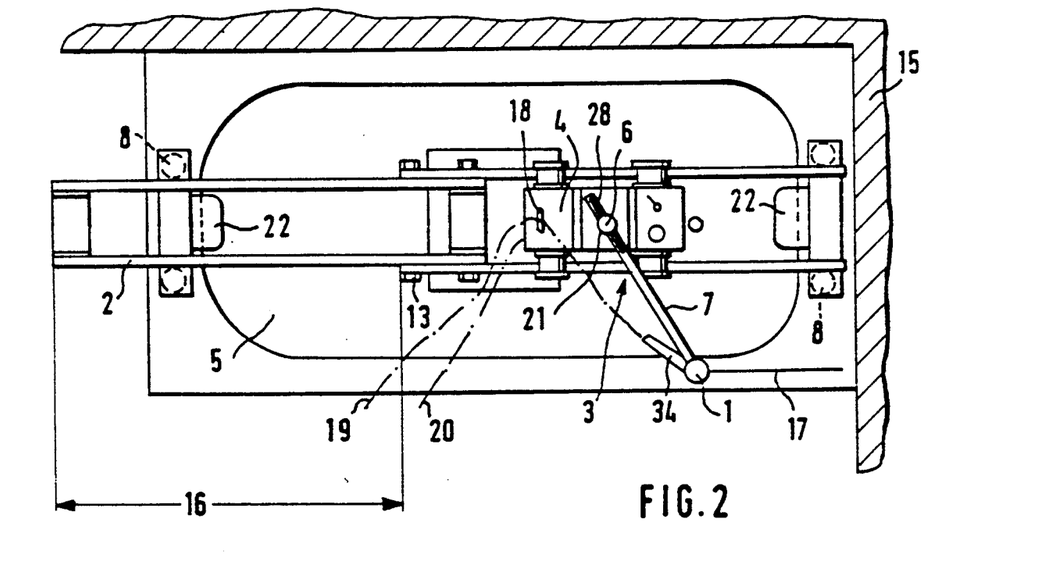
FIG. 2 is a top view of the arrangement according to FIG. 1.

FIGS. 1 and 2 illustrate the device of the invention in an arrangement, in which a cut along the longitudinal edge of a tub 5 is supposed to occur. The arrangement includes a cutting device 1 in the form of a plasma-cutting device with the cutting device 1 being only schematically illustrated in FIGS. 1 and 2. The cutting device 1 is supported on a carriage 4 by means of a pivotal mounting 3, which carriage is movable along a guide rail 2. The carriage 4 has according to the invention a drive so that same can be driven at a constant speed along the guide rail 2.

The guide rail 2 can be telescopically extended in the illustrated exemplary embodiment and includes two rail portions not identified in detail, which rail portions can be fixed to one another at a pregiven guide rail length by means of a slotted hole 12 and fastening devices 13.

The tub 5 is in the illustrated exemplary embodiment supported on two sides by a base provided with tiles 14, while the other two sides of the tub 5 border on a wall 15. The carriage 4 has in the illustrated exemplary embodiment already been moved to the left for a specific distance so that a cut 17 had already been made. The distance 16 is available for the remaining movement of the carriage 4.

The carriage 4 has according to the invention at least one hose holder 18 on its upper side, through which are guided a burner hose and a cable 19. FIG. 2 shows furthermore an electric connection 20 for the drive of the carriage 4.

The pivotal mounting 3 includes an arm 7 pivotal about a vertical axis 6 relative to the carriage 4. The arm 7 can have a slotted hole 28 at its pivot end in order to enable additionally a lateral adjustment. A fastening device 21 is arranged on the carriage 4 in order to mount the arm 7 in the preset position.

Suction means 8 in the form of suction feet are furthermore provided on the guide rail 2, which suction feet enable a mounting onto the tub. Furthermore, it is possible to fasten a contour plate 22 on the guide rail 2 in the area of the suction means 8 in order to achieve in addition a locking and an exact mounting on the tub.

Figure 3:
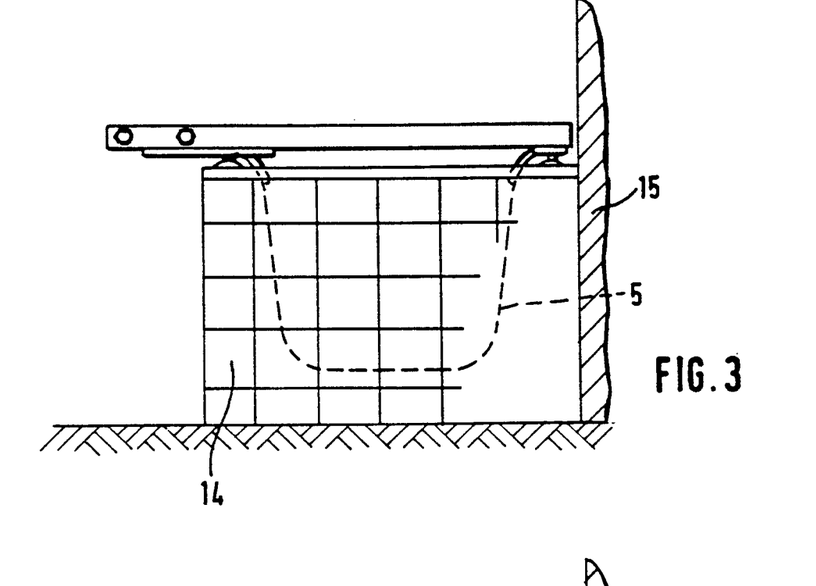
FIG. 3 is a further installation position of the guide rail of the invention.
Figure 4:
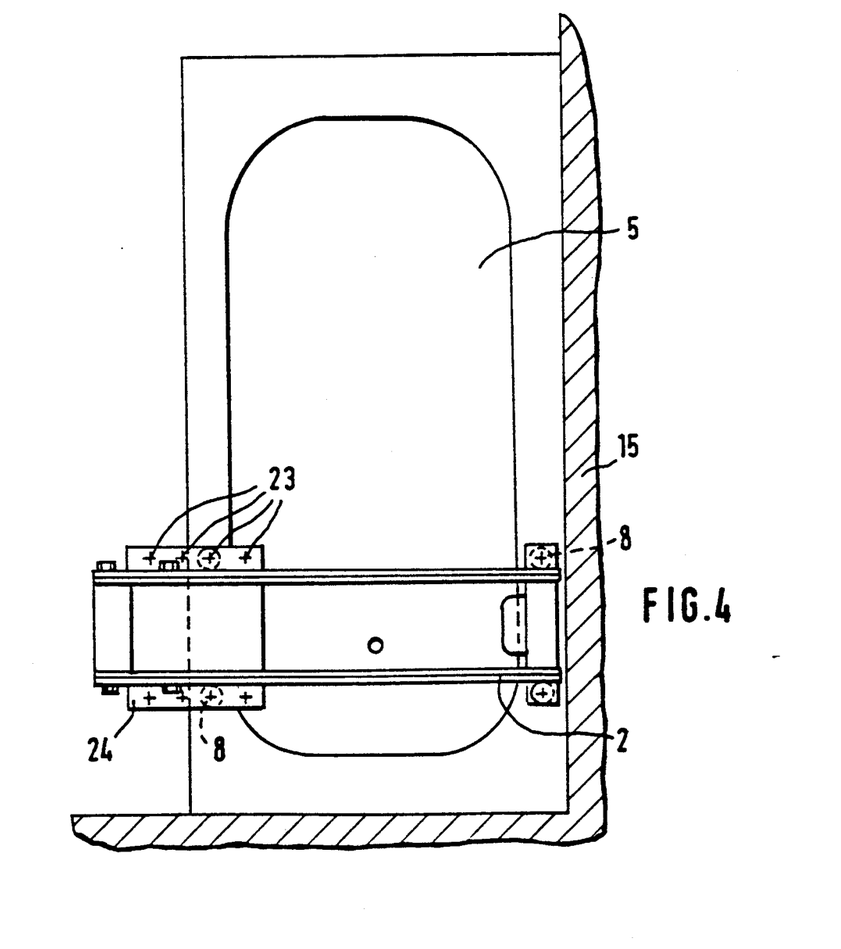
FIG. 4 is a top view of the arrangement shown in FIG. 3.

FIGS. 3 and 4 illustrate an arrangement, in which the rail portions of the guide rail 2 are moved telescopically into one another in order to be mounted in transverse direction onto the tub 5.

The guide rail 2 has a bearing plate 24 at one end. Several connections 23 for the suction means 8 are constructed on said bearing plate 24, so that a universal adjustment to many different tub sizes is possible. The telescopelike guide rail is set to the shortest possible length in the exemplary embodiment illustrated in FIGS. 3 and 4.

Figure 5:
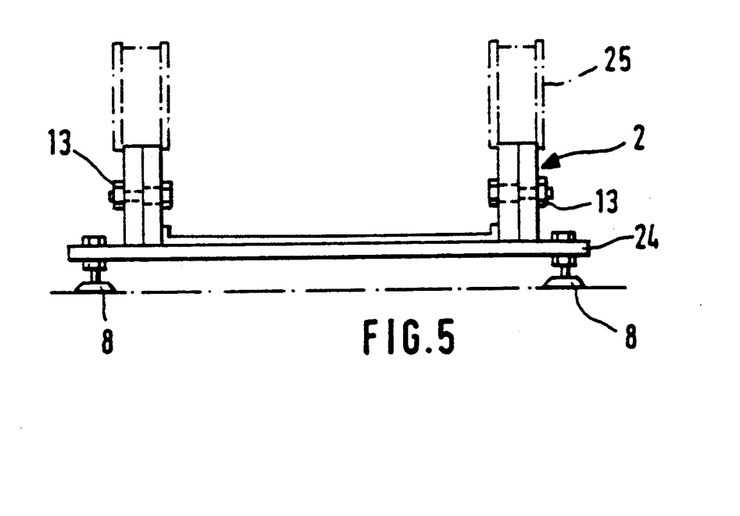
FIG. 5 is a schematic front view of the guide rail of the invention.

FIG. 5 is a front view of the end of the guide rail 2 illustrated in FIGS. 3 and 4. The bearing plate 24 and the suction means 8 can thereby be recognized in particular. The duplicate design of the guide rail 2 in the form of rail parts which are movable telescopelike relative to one another is furthermore shown. The fastening devices 13 can be screws and wing nuts.

Figure 6:
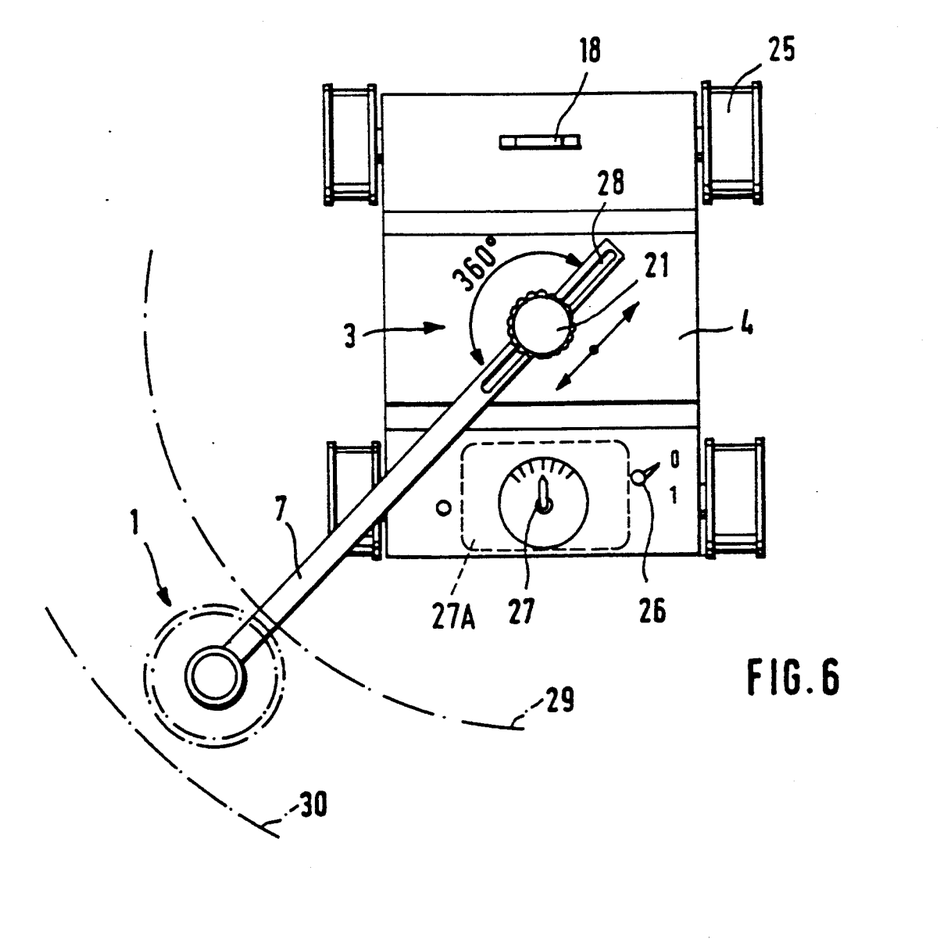
FIG. 6 is a top view of the carriage of the invention and of the pivotal mounting.

A top view of the carriage 4 of the invention is shown in FIG. 6. The carriage 4 has four wheels 25 and has, in addition to the pivotal mounting 3 enabling a 360° pivoting of the arm 7, an on-and-off switch 26 and a speed adjusting means 27 for controlling a drive unit 27A.

The slotted hole 28 of the arm 7 permits a movement of the arm 7 in longitudinal (radial) direction so that a minimum radius 29 and a maximum radius 30 can be achieved. However, it is also possible to produce a circular cut at the corner areas of the tub 5.

To guarantee a safe guiding of the wheels 25 on the guide rail, the wheel 25 has a flange on both sides.

Figure 7:
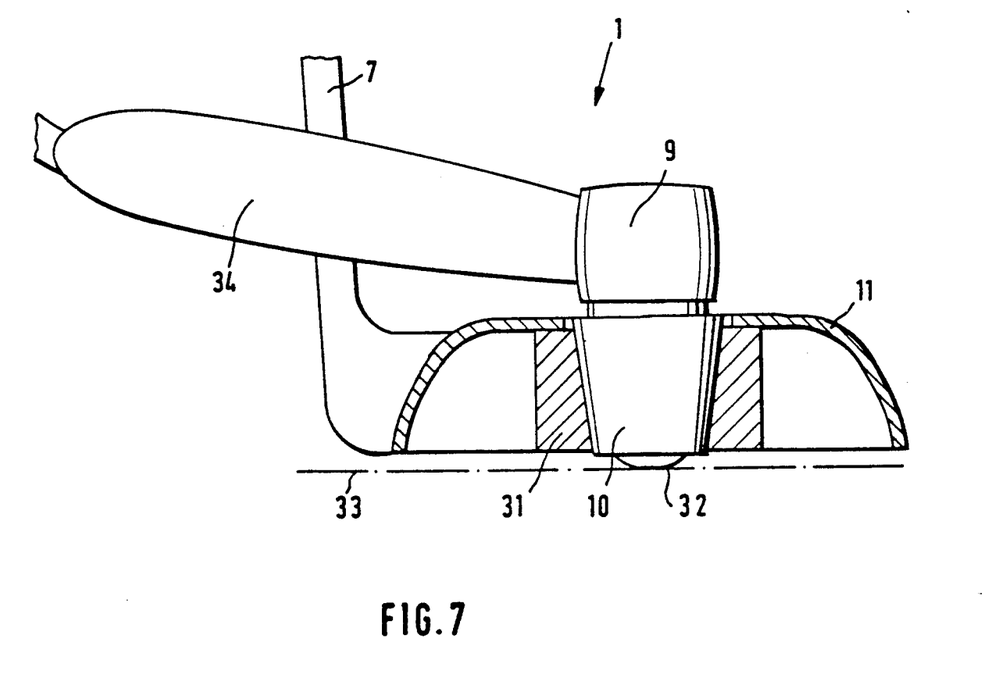
FIG. 7 is a schematic side view of the cutting device with a heat protective shield and screen.
Figure 8:
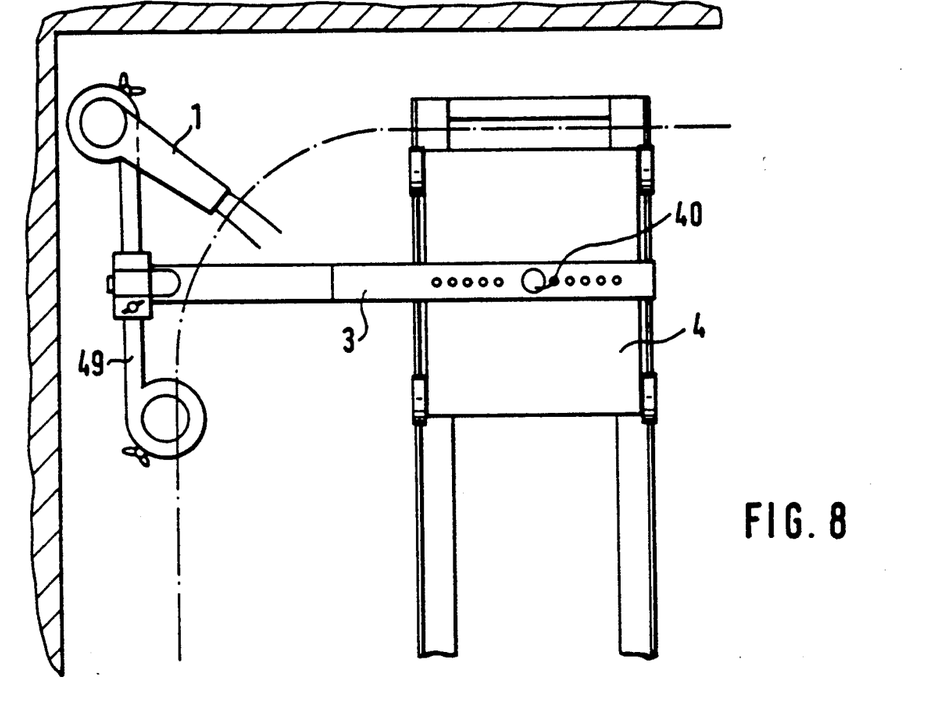
FIG. 8 is a top view of a further embodiment of a device of invention.
Figure 9:
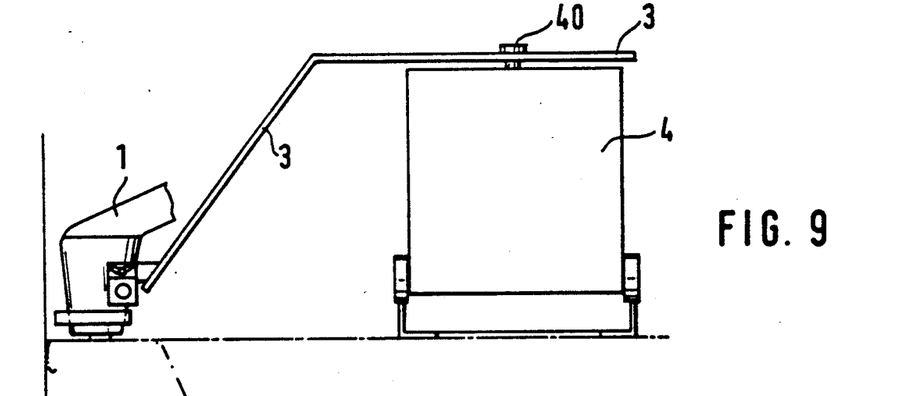
FIG. 9 is a partially cross-sectional side view of the device.
Figure 10:
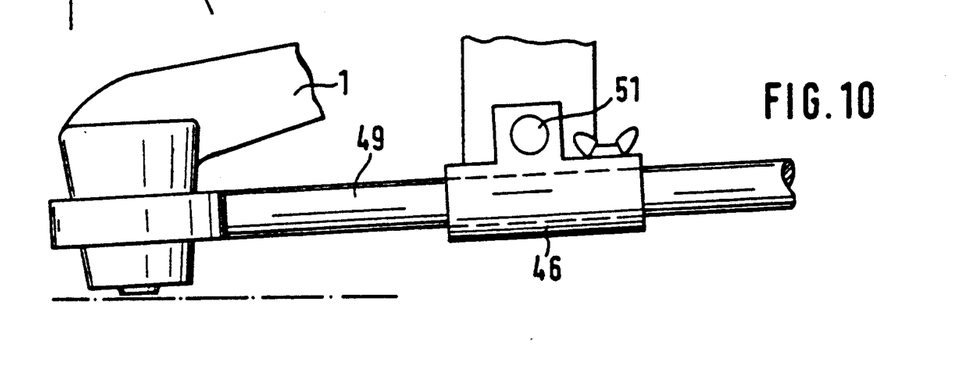
FIG. 10 is a side view of the cutting head 1 with its mounting.

FIG. 7 schematically illustrates the cutting device of the invention, which is constructed like a plasma-cutting device. A retaining ring 31 is constructed at the free end of the arm 7. A heat protective shield 10 connected to a burner head 9 can be placed into said retaining ring 31. The arm 7 is adjusted such that a burner nozzle 32 can be placed onto the surface 33 of the tub 5 without the heat protective shield 10 or the retaining ring 31 contacting the surface 33 of the tub. A screen 11 is furthermore provided, which is secured on the arm 7 or on the retaining ring 31 and which is utilized for additional shielding. The heat protective shield 10 has in the mounted position shown in FIG. 7 contact with a switch turning off the cutting device as soon as the heat protective shield 10 is removed from the burner head 9. A handle of the cutting device 1 is identified with reference numeral 34.

The arm 3 has advantageously many parts as shown in FIGS. 7 to 13. The arm is in FIGS. 8 to 10 arranged on the upper side of the carriage 4 and is bent so that it can work the edge of the tub laterally of the carriage. In the exemplary embodiments according to FIGS. 11 to 13 the arm 3 is bent several times so that also the areas below the carriage 4 can be worked as particularly shown in FIG. 11.

Figure 11:
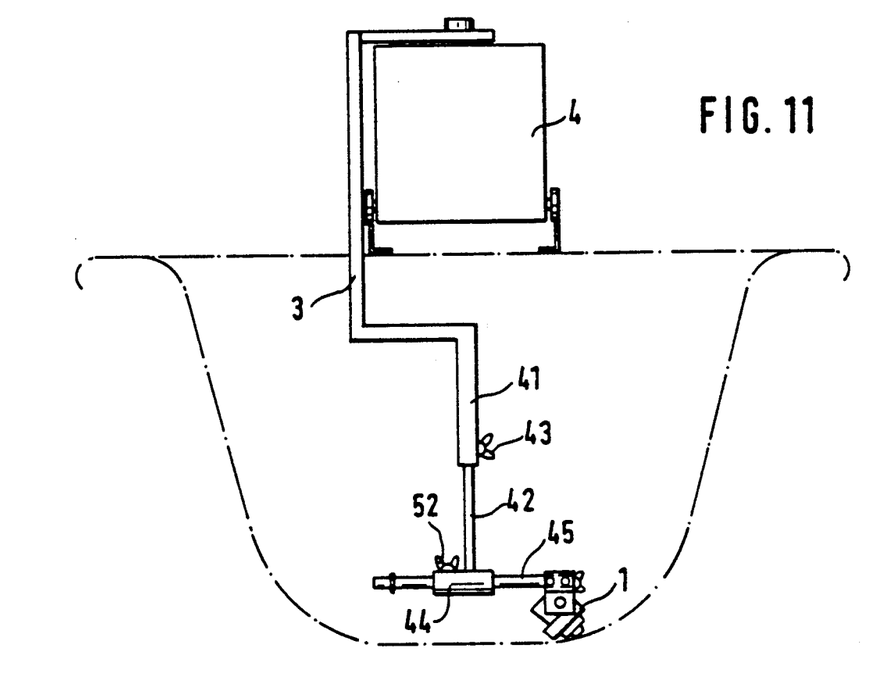
FIG. 11 illustrates a further embodiment of a device with a multiply adjustable arm for working of the bottom of the tub.

The arm is constructed rotatably about at least five axes and adjustable in length and width for the adjustment and adaptation of the cutting head to the respective surface of the tub wall, so that the cutting head 1 can be moved in practically every tub wall inclination by means of the carriage 4.

Figure 12:
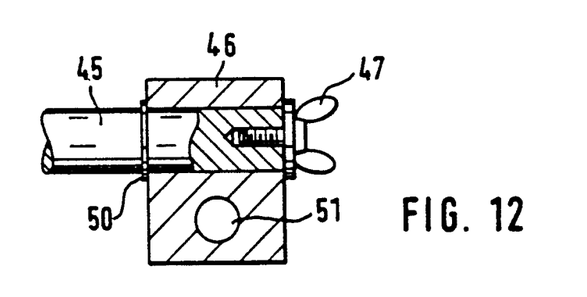
FIG. 12 is a cross-sectional view of the sleeve for the mounting of the cutting device.
Figure 13:
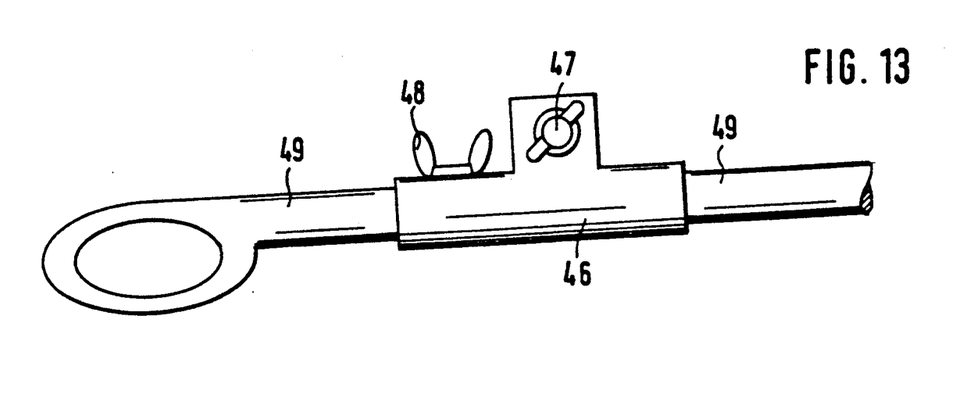
FIG. 13 is a top view of the sleeve for the mounting of the cutting device.

The cutting head 1 is advantageously adjusted to the tub wall by being supported in a mounting 46 constructed freely rotatably around the arm 45 thus enabling an automatic adaptation of the cutting head 1 to curved surfaces of the tub.

The invention is not limited to the illustrated exemplary embodiments, rather many possibilities for modifications result for the man skilled in the art.

The embodiments of the invention in which an exclusive property or privilege is claimed are defined as follows:

1. A method for cutting up or rather trimming tubs, in particular bath tubs or shower tubs, wherein the tubs are cut by means of a vibration-free cutting method, in particular by a plasma-cutting or laser-cutting method.

2. The method according to claim 1, wherein a cutting device is moved by means of a drive along a guide rail aligned with respect to the tub.

3. A device for cutting of tubs, comprising a cutting device, the cutting device including pivotal mounting means for pivotally mounting the cutting device on a carriage guided on at least one guide rail mounted on the tub, the guide rail including fastening means for releasably fastening the guide rail to the tub, the guide rail further including first adjustment means for facilitating an adjustment of the length of the guide rail, the pivotal mounting means including an arm pivotal about a vertical axis and a second adjustment means for facilitating an adjustment of the length of the arm, and the cutting device being provided at the end of the arm remote from the pivotal mounting means.

4. The device according to claim 3, wherein a drive means is provided on the carriage for propelling the carriage along the guide rail.

5. The device according to claim 3, wherein the pivotal mounting means includes means enabling the arm to be moved about an angle of traverse of 360°.

6. The device according to claim 3, wherein the fastening means includes suction cup means.

7. The device according to claim 6, wherein the first adjustment means includes means facilitating a movement of the suction cup means relative to the guide rail to adjust to the respective dimension of the tub.

8. The device according to claim 3, wherein the guide rail includes multiple components and wherein the first adjustment means includes a telescopelike connection between the components to facilitate the aforesaid adjustment of the length.

9. The device according to claim 3, wherein the cutting device is designed in the form of a plasma-cutting device.

10. The device according to claim 9, wherein said cutting device includes a burner head and a heat protective shield supported on the burner head, which shield in the mounted state is operatively connected to a safety switch to operate the cutting device.

11. The device according to claim 10, wherein the burner head and/or the heat protective shield are covered by a screen.

12. The device according to claim 9, wherein a flow pressure of 2 to 4 bar is set for said cutting device.

13. The device according to claim 9, wherein the cutting device has a power-supply compensation device to connect to a 220 volt-amp. supply.

14. The device according to claim 9, wherein the cutting device has a high-frequency device permitting a free ignition of the arc to assure an easier penetration into the enamel of the tub.

15. The device according to claim 3, wherein the second adjustment means includes plural joints for facilitating an adjusting of the cutting device in all spatial axes such that the cutting device is always aligned to move parallel with respect to the surface to be cut.

16. The device according to claim 3, wherein the arm includes means defining plural fastening points for facilitating a selective fastening of the arm to the carriage.

17. The device according to claim 16, wherein each fastening point supports the arm for pivotal movement on the carriage.

18. The device according to claim 3, wherein the arm has two parts and wherein the second adjustment means includes means for telescopically connecting the arms to one another and a setscrew for fixing the telescopically related arms to one another.

19. The device according to claim 18, wherein the parts are designed rotatably relative to one another.

20. The device according to claim 18, wherein a sleeve is fastened to the end of one of the parts of the arm transversely with respect to the axis of said one part, which sleeve receives a further part of the arm.

21. The device according to claim 20, wherein the further arm part is movable in a bore of the sleeve and can be fixed therein by means of a screw.

22. The device according to claim 20, wherein a further sleeve is fastened freely pivotally movably on the further arm part, which further sleeve has a bore receiving a mounting device for the cutting device.

23. The device according to claim 22, wherein the mounting device and thus the cutting device are movably arranged in the further sleeve and can be fixed therein by means of a screw.

24. The device according to claim 22, wherein the further sleeve receives in said bore thereof a pipe of the mounting device.

* * * * *